Mar. 6, 1923.
E. ROY.
LOCKING DEVICE.
FILED SEPT. 11, 1922.
1,447,573.
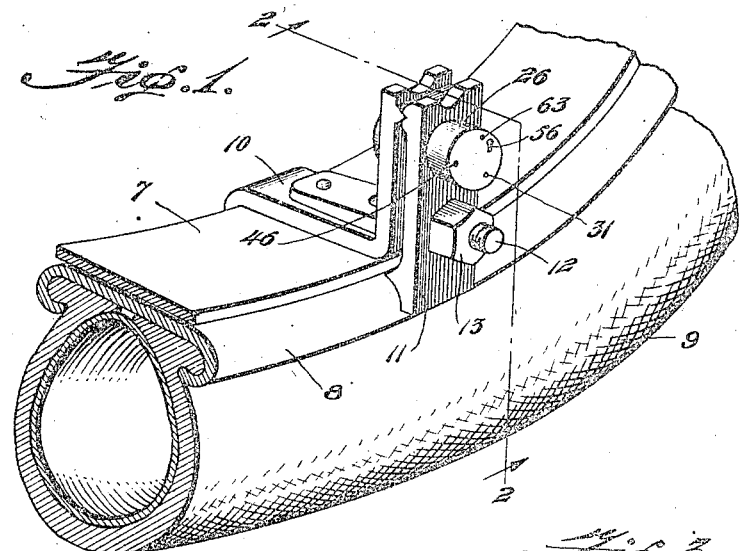
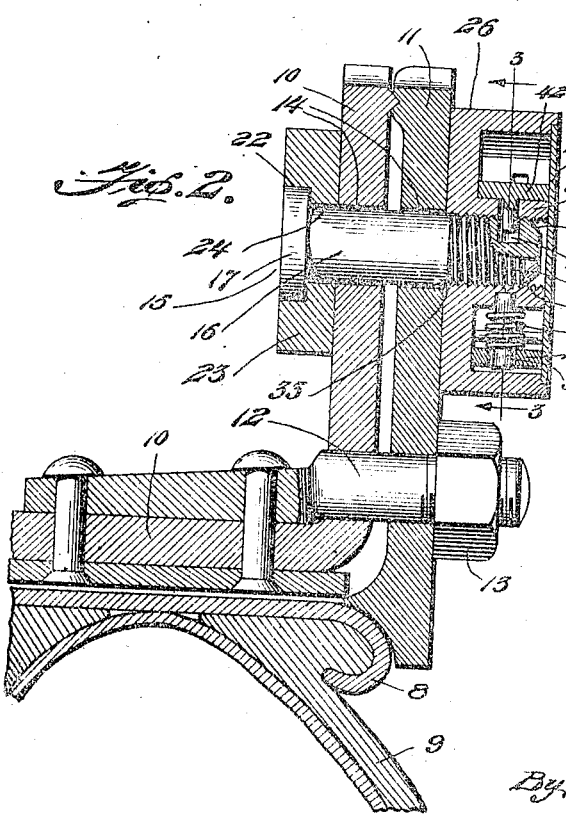
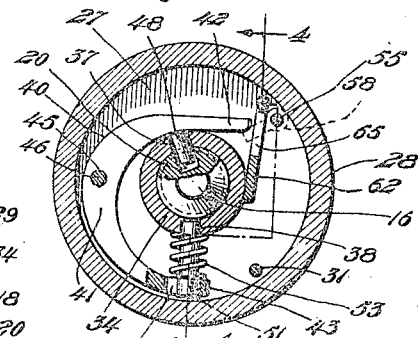
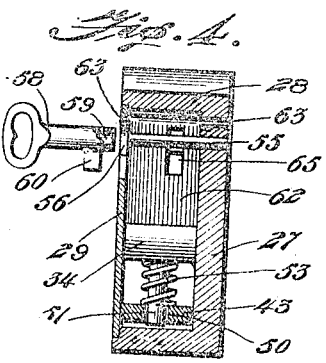
Inventor
Edward Roy
By Horatio E. Bellows
Attorney Patented Mar. 6, 1923.

1,447,573

UNITED STATES PATENT OFFICE.

EDWARD ROY, OF PROVIDENCE, RHODE ISLAND.

LOCKING DEVICE.

Application filed September 11, 1922. Serial No. 587,272.

*To all whom it may concern:*

Be it known that I, EDWARD ROY, a citizen of the United States, residing at Providence, in the county of Providence and State of Rhode Island, have invented certain new and useful Improvements in Locking Devices, of which the following is a specification.

My invention relates to devices for clamping and locking articles or parts of various kinds.

The essential objects of my invention are security against theft; adaptability for use upon articles of various thickness; security; simplicity of operation; compactness; and inexpensiveness of construction.

To the above ends essentially my invention consists in such parts and in such combinations of parts as fall within the scope of the appended claims.

In the accompanying drawings which form a part of this specification,

Figure 1 is a perspective view of my novel locking device applied to the retaining members of a spare automobile tire, the latter being shown broken away, Figure 2, a partial section on line 2—2 of Figure 1, Figure 3, a section on line 3—3 of Figure 2, and Figure 4, a section on line 4—4 of Figure 3.

Like reference characters indicate like parts throughout the views.

My locking device is described herein in conjunction with a spare tire carrier of an automobile wherein 7 is the supporting ring, 8 the felly, 9 the tire, 10 the fixed plate and 11 the movable or clamp plate, 12 the attaching pin, and 13 the nut thereon, all as usual. The two plates have registering holes 14 which usually accommodate the hinged member of the padlock.

My structure includes a bolt 15 comprising a shank 16, and a cylindrical fixed head 17. The end of the shank is preferably beveled at one end, as at 18, and is provided with a screw thread 19. In its threaded area is a radial recess 20. The head 17 is loosely seated in a circular cavity 22 in a disk or collar 23 whose central opening 24 admits the shank upon which it is rotatable. The outer face of the head 17 is thus flush with the outer face of the disk 23.

A nut 26 of special construction is provided. This is a cylindrical housing comprising a back 27, a side 28, and a face plate 29. The plate is fixed to the side in any convenient manner, in this case by a rod 31 riveted in the face and back. The back is provided with a central opening 33, and with an internal hub 34 extending to the face plate. The opening in the back and the bore of the hub are provided with a thread 35 adapted to receive the thread 19 of the bolt. The hub has at opposite points in its side perforations 37 and 38.

A crescent shaped plate 40 comprises a body portion 41 with tapering end portions or arms 42 and 43. This plate constitutes a broad lever provided in the center of the body with a hole 45 to loosely receive a pin 46 riveted in the front and back of the housing and serves as a pivot pin. The arm 42 has fast thereto a pin 48 adapted to extend loosely into the recess 20. The arm 43 has a slot 50 into which extends a pin 51 whose inner end is fast in the perforation 38 of the hub. A helical spring 53 surrounds the latter pin and has its ends pressing against the hub and the arm 43. This spring normally retains the pin 48 in its recess 20.

A key post 55 fast in the back plate extends to a key opening 56 in the face plate adjacent the arm 42. A key 58 has a recess 59 to permit application to the key posts; and the lug or foot 60 of the key is, when inserted into the housing, in the path of the arm 42 and serves to elevate the arm 42 and thus removes the pin 48 from its recess. In this instance there is provided a key plate 62 having at one end lateral lugs 63 riveted in the back and face plate of the housing for the purpose of attachment. This plate has a slot 65 for the admission of the key portion 60 to the lever.

In operation the shank 14 of the bolt is passed through the opening in the parts to be locked as shown, with the disk 23 abutting against one member. Upon the threaded end of the bolt the member 26 is screwed, thus drawing the head 17 into its seat, and tightening the disk and housing upon the members to be locked. During the screwing operation the pin 48 is elevated by the key 58 until the recess 20 is reached, whereupon the key is turned and the spring 53 forces the pin into locked position.

It is obvious that changes in details of construction within the spirit of my invention may be made. The description of the device has been given in detail merely for clearness of understanding and no undue limitation should be understood therefrom.

I claim:—

1. In a device of the character set forth, a bolt provided with a screw thread, a housing provided with a hub having a threaded opening adapted to receive the bolt, and with a key hole, a vibratory lever yieldingly mounted in the housing transversely of the hub comprising an arm at one side of the bolt adjacent the key hole, and an arm at the opposite side of the bolt, and a projection on one arm engageable with the bolt.

2. In a device of the character set forth, a bolt comprising a shank and a head, a collar loose on the shank provided with a cavity loosely enclosing the head, a housing provided with an opening to receive the bolt and with a key hole, a vibratory lever yieldingly mounted in the housing comprising an arm at one side of the bolt adjacent the key hole, and an arm on the opposite side of the bolt, and a projection on one arm engageable with the bolt.

3. In a device of the character set forth, a bolt, a housing provided with an opening adapted to receive the bolt, and with a key hole, a vibratory lever yieldingly mounted in the housing comprising arms extending to opposite sides of the bolt, a projection on one arm adapted to engage the bolt, and a key plate in the housing intermediate the last mentioned arm and the hole.

In testimony whereof I have affixed my signature.

EDWARD ROY.